United States Patent [19]

Schmerling

[11] 3,883,594

[45] May 13, 1975

[54] PROCESS FOR THE ACYLATION OF AROMATIC HYDROCARBONS

[75] Inventor: Louis Schmerling, Riverside, Ill.

[73] Assignee: Universal Oil Products Company, Des Plaines, Ill.

[22] Filed: Apr. 11, 1974

[21] Appl. No.: 459,976

[52] U.S. Cl. ............................................. 260/592
[51] Int. Cl. ............................................ C07c 49/76
[58] Field of Search ..................................... 260/592

[56] References Cited
UNITED STATES PATENTS 2,047,656  7/1936  Wirth .............................. 260/592
2,291,778  8/1942  Wakeman ......................... 260/592

*Primary Examiner*—Daniel D. Horwitz
*Attorney, Agent, or Firm*—James R. Hoatson, Jr.; Raymond H. Nelson; William H. Page, II

[57] ABSTRACT

Acylation of aromatic hydrocarbons which comprises reacting said aromatic hydrocarbon with an acyl halide and a saturated hydrocarbon which contains at least one tertiary carbon atom, or which is isomerized to form a saturated hydrocarbon containing a tertiary carbon atom, in the presence of a Friedel-Crafts catalyst is disclosed.

8 Claims, No Drawings

PROCESS FOR THE ACYLATION OF AROMATIC HYDROCARBONS

This invention relates to a process for the acylation of an aromatic hydrocarbon. More specifically, this invention relates to a process for the acylation of an aromatic hydrocarbon which comprises reacting said aromatic hydrocarbon with an acyl halide and a saturated hydrocarbon which contains at least one tertiary carbon atom, or which is isomerized to form a saturated hydrocarbon containing a tertiary carbon atom, in the presence of a Friedel-Crafts catalyst.

The reaction known as acylation is well known in the art of chemistry. One such acylation reaction is that of an aromatic compound with acid anhydrides, esters or acyl halides, said acyl halides including aromatic acyl halides as exemplified by Equations I, II, and III below. It is also well-known in the art that the acylation of an aromatic compound may take place in the presence of a Friedel-Crafts catalyst.

It is therefore an object of this invention to provide a process for the preparation of ketones.

A further object of this invention is to provide a process for the preparation of ketones utilizing a certain acylation process which will permit the recovery of the desired ketones in a more pecuniary rewarding manner.

In one aspect an embodiment of this invention resides in a process for the acylation of an aromatic hydrocarbon which comprises reacting said aromatic hydrocarbon with an acyl halide and a saturated hydrocarbon containing at least one tertiary carbon atom, or which is isomerized to form a saturated compound containing a tertiary carbon atom during the reaction, in the presence of a Friedel-Crafts catalyst at acylation conditions, and recovering the resultant acylated aromatic compounds.

A specific embodiment of this invention resides in a process for the preparation of ketones which comprises Equation I 

Equation II 

Equation III 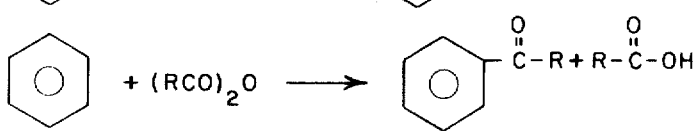

In contradistinction to the prior art it has now been discovered that an aromatic hydrocarbon may be acylated by the reaction of said aromatic hydrocarbon with an acyl halide and a saturated hydrocarbon containing at least one tertiary carbon atom, or which is isomerized to form a saturated compound containing a tertiary carbon atom, in the presence of a Friedel-Crafts catalyst; there is produced not only the ketone which is formed in the absence of the saturated hydrocarbon but also alkylated derivatives of the ketone, the alkyl group in said derivative being formed by abstraction of a hydrogen atom from the saturated hydrocarbon. The consequence of the above set forth invention will allow the manufacturer of various ketones to utilize a greater variety of reactions to produce a specific ketone and will allow the use of more varied aromatic charge stocks for the production of necessary ketones. The utilization of this invention will also result in a savings to the manufacturer as a result of a decrease in the heat and energy necessary to effect the acylation and alkylation and as a result of a decrease in the capitalization necessary for equipment to initiate production of the desired compounds.

The desired products of the process of this invention, namely alkylaromatic hydrocarbons and ketones, are utilized in the chemical industry in many ways. For example, ketones such as propiophenone may be used as additives to waxes and surface coating compositions; as a fixative in perfumes; in the synthesis of certain pharmaceuticals such as ephedrine; as the raw material in the preparation of other organic chemicals; as floral odors; as tear gas when said ketones have been chlorinated; resins; etc.

the acylation of benzene with propionyl chloride and isopentane in the presence of aluminum chloride at about room temperature and a pressure of about 1 atmosphere, and recovering the resultant acylated aromatic compounds, namely, propiophenone, pentylpropiophenone, [a mixture of (1,2-dimethylpropyl)propiophenone and (1,1-dimethylpropyl)propiophenone], and n-propylpropiophenone.

Another specific embodiment of the present invention resides in a process for the preparation of ketones which comprises acylating benzene with propionyl chloride and methylcyclopentane in the presence of aluminum chloride at about room temperature and a pressure of 1 atmosphere, and recovering the resultant acylated aromatic compounds, namely, propiophenone, (methylcyclopentyl)propiophenone and n-propylpropiophenone.

Other objects and embodiments will be found in the following further detailed description of the present invention.

As hereinbefore set forth the present invention is concerned with a process for acylating an aromatic compound in the presence of certain catalytic compositions of matter. The reaction is effected under conditions which include an acylation temperature in the range of from about 0°C to about 100°C and preferably in the range of from about 10°C to about 50°C. In addition, another reaction condition involves pressures, said pressures ranging from atmospheric up to 100 atmospheres or more. When superatmospheric pressures are employed, said pressures are usually afforded by the introduction of a substantially inert gas such as nitrogen into the reaction zone. The pressure may also be that of the reactants and products at the reaction temperatures.

Another variable which may be employed in the present invention is the amount of reactants; the aromatic hydrocarbon, the acyl halide and the saturated hydrocarbon may be present in an even molar ratio or the molar ratio of any of the reactants to the other may be varied to the extent of a six-fold change from one reactant to the other.

Suitable acyl halides which are utilized as one of the starting materials in the process of this invention include, in particular, all acyl halides within Structure I below $$\begin{array}{c} O \\ \| \\ R-C-X \end{array}$$

Structure I wherein R is an alkyl possessing between one and 20 carbon atoms or halo substituted alkyl and where X is a halide. Suitable examples of acyl halides would include acetyl fluoride, acetyl chloride, acetyl bromide, acetyl iodide, mono-, di-, and trichloroacetyl chloride, mono-, di-, and tribromoacetyl bromide, propionyl chloride, propionyl fluoride, propionyl bromide, propionyl iodide, n-butyryl chloride, n-butyryl bromide, isobutyryl chloride, isobutyryl bromide, isobutyryl iodide, n-valeryl chloride, n-valeryl bromide, isovaleryl chloride, isovaleryl bromide, isovaleryl iodide, n-caproyl chloride, n-caproyl bromide, n-caproyl fluoride, n-caproyl chloride, n-caproyl bromide, n-caproyl iodide, stearoyl chloride, stearoyl bromide, stearoyl iodide, etc.

Suitable examples of aromatic hydrocarbons which may be reacted with other suitable reactants would include all aromatic hydrocarbons within Structure II

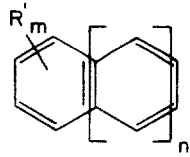

Structure II wherein $n$ is equal to an integer of between 0 and 5 and R' is equal to lower alkyl, cycloalkyl possessing a carbon number range of from about three to eight carbon atoms, substituted lower alkyl, substituted cycloalkyl, and $m$ is equal to an integer between 1 and 5. Specific examples of suitable aromatic compounds contemplated within Structure II would include benzene, naphthalene, anthracene, phenanthrene, naphthacene, chrysene, pyrene, toluene, o-xylene, ethylbenzene, cyclopentylbenzene, 1,3-dicyclohexylbenzene, etc.

Suitable examples of saturated hydrocarbons contemplated within the scope of this invention would include all saturated compounds, both aliphatic and cyclic, which contain a tertiary carbon atom or which are isomerized to a saturated hydrocarbon containing such a carbon atom under the reaction conditions. These include isobutane, isopentane, isohexane, isoheptane, isooctane, isononane, isodecane, and higher molecular weight branched chain paraffins containing at least one tertiary carbon atom, and cycloalkane containing a tertiary carbon atom such as methylcyclobutane, methylcyclopentane, methylcyclohexane, methylcycloheptane, methylcyclooctane, methylcyclononane, methylcyclodecane. Compounds which can isomerize to hydrocarbons containing tertiary carbon atoms include n-butane, n-pentane and cyclohexane. Suitable saturated hydrocarbons contain from four to about 20 carbon atoms per molecule.

The catalysts which are utilized in the process of this invention will comprise the Friedel-Crafts type catalysts including aluminum chloride, aluminum bromide, zirconium chloride, and boron fluoride as the preferred catalysts. Although boron is a metalloid, for the purposes of this invention it is to be classified as a metal. It is also contemplated within the scope of this invention that other metallic halides such as ferric chloride, stannic chloride, titanium tetrachloride, bismuth chloride, and zinc chloride as well as protonic acid catalysts such as hydrogen fluoride may be used, although not necessarily with equivalent results.

It is understood that the aforementioned acyl halides, aromatic hydrocarbons, saturated hydrocarbons and Friedel-Crafts catalysts are only representative of the class of compounds which may be employed, and that the present invention is not necessarily limited thereto.

When the aromatic hydrocarbon is treated with the acyl halide in the presence of the saturated hydrocarbon and catalyst, several reactions occur. In one, the acyl halide reacts with the aromatic hydrocarbon to yield an arylalkyl ketone. In another an intermediate reacts with the saturated hydrocarbon to form an alkylaromatic and an intermediate which reacts with the aryl alkyl ketone to form an alkylaryl aryl ketone. The alkylaromatic apparently then undergoes reaction with the acyl halide to yield an alkylaryl alkyl ketone. The acyl halide may also be reduced to an aldehyde by reaction with the saturated hydrocarbon; reaction of the aldehyde with the aromatic hydrocarbon yields a 1,1-diarylalkane. For example, the aluminum chloride catalyzed reaction of propionyl chloride with benzene and isopentane apparently proceeds by the following pathways

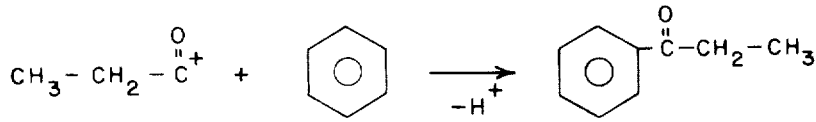

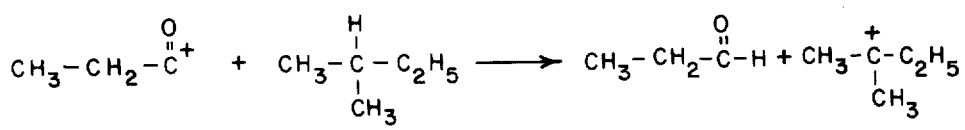
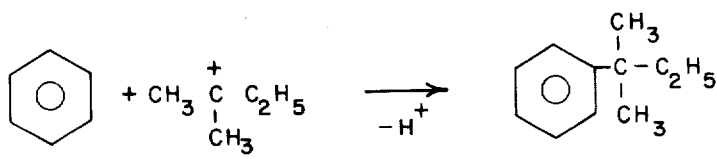
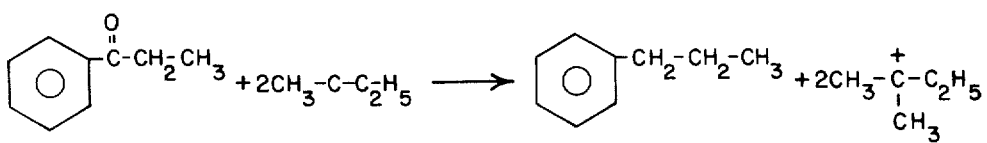
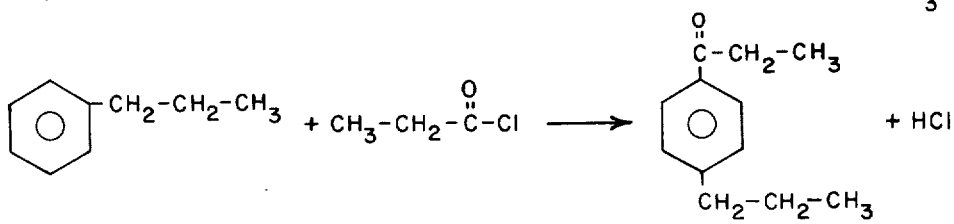

The t-pentylbenzene undergoes partial isomerization to secisopentylbenzene (i.e., 2-phenyl-3-methylbutane) and sometimes neopentyl benzene (i.e., 1-phenyl-2,2-dimethylpropane.)

The process of this invention may be effected in any suitable manner and may comprise either a batch or continuous type operation. For example, when a batch type operation is employed, the reactants comprising the aromatic hydrocarbon, the saturated hydrocarbon and the acyl halide are placed in an appropriate apparatus along with a Friedel-Crafts catalyst. If atmospheric pressure is to be employed, the reaction vessel is then heated to a predetermined operating temperature, often the reflux temperature of the aromatic hydrocarbon. After maintaining the reactants in the reaction vessel at this temperature for a reaction time which may range from 0.5 up to 20 hours or more in duration, heating is discontinued and the vessel allowed to return to room temperature. The reaction mixture is then recovered, treated with water and the organic layer is separated and subjected to conventional means of purification and separation, said means including washing, drying, extraction, evaporation, fractional distillation, etc., whereby the reaction products are recovered. Alternatively, if superatmospheric pressures are to be employed in the reaction, the reactants and catalyst are charged to a pressure vessel such as a rotating autoclave. The autoclave is sealed and a substantially inert gas such as nitrogen is pressed in until the desired operating pressure is reached. The autoclave is then heated to a desired operating temperature and maintained thereat for a predetermined residence time. At the end of this time heating is discontinued, the autoclave is allowed to return to room temperature and the excess pressure is discharged. The autoclave is opened and the reaction mixture is then treated in a manner similar to that hereinbefore set forth whereby the desired ketones and other products are separated and recovered.

It is contemplated within the scope of this invention that the reaction process for obtaining a ketone may be effected in a continuous manner of operation. When such a type of operation is employed the reactants are continuously charged to the reaction vessel containing the Friedel-Crafts catalyst, said vessel being maintained at proper operating conditions of temperature and pressure. After completion of the desired residence time, the reactor effluent is continuously withdrawn and subjected to conventional means of separation whereby the desired ketones and other products are recovered while any unreacted starting material comprising the aromatic hydrocarbons, the saturated hydrocarbons and any unreacated acyl halide are recycled to the reaction zone to form a portion of the charge stock. Inasmuch as the catalytic composition of matter is solid in nature, various types of continuous operation may be used. One such type of operation which may be employed comprises the moving bed type operation in which the catalyst and the reactants are passed through the reaction zone either concurrently or countercurrently to each other, or the slurry type operation in which the catalyst is carried into the reaction zone as a slurry in either or all of the reactants.

The following examples are given to illustrate the process of the present invention and are not intended to limit the generally broad scope of the present invention in strict accordance therewith.

EXAMPLE I

In this example a mixture of 80.0 grams of benzene, 72.0 grams of isopentane and 40.0 grams of aluminum chloride was placed in a glass flask provided with stirring means, a dropping funnel and a condenser. The mixture was continuously stirred while a solution of 25.0 grams of propionyl chloride in 36.0 grams of isopentane was added by a dropwise addition from the funnel to the stirred mixture, the temperature during the reaction time comprising 90 minutes being maintained at a range from 23°C to 25°C. After addition of the propionyl chloride-isopentane solution the organic layer containing the product was recovered by decantation, said organic layer weighed 49.0 grams subsequent to water-washing. The recovered product was analyzed by means of gas-liquid chromatography which revealed the chief product to be propiophenone with several other compounds possessing longer retention times. The latter were characterized by preparatory gas-liquid chromatography and found to comprise pentylpropiophenone; a mixture of sec-isopentylpropiophenone (also known as [1,2-dimethylpropyl]propiophenone) and t-pentylpropiophenone (also known as [1,1-dimethylpropyl]propiophenone), n-propylpropiophenone and 1,1-diphenyl-propane.

EXAMPLE II

In this example a mixture of 84.0 grams of methylcyclopentane and 40.0 grams of aluminum chloride were placed in a glass acylation flask provided with stirring means. The mixture was continuously stirred while a second mixture comprising 25.0 grams of propionyl chloride, 41.0 grams of bezene and 80.0 grams of methylcyclopentane was added by a dropwise addition to the stirred mixture. The temperature during the reaction time comprising 192 minutes ranged from 26°C to 28°C. After addition of the proprionyl chloride-benzene-methylcyclopentane mixture the organic layer containing the product was recovered by decantation, said organic layer weighing 39.0 grams subsequent to water-washing. The recovered product was analyzed by means of gas-liquid chromatography which revealed the chief product to be propiophenone with several other compounds possessing longer retention time. The remainder of the sample was analyzed by preparatory gas-liquid chromatography and found to contain three isomers of methylcyclopentylpropiophenone, n-propylpropiophenone and n-propyl propionate.

EXAMPLE III

In this example a mixture of 80.0 grams of benzene, 84.0 grams of methylcyclopentane and 40.0 grams of aluminum chloride was placed in a glass acylation flask provided with stirring means. The mixture was continuously stirred while a solution of 25.0 grams of propionyl chloride and 40.0 grams of methylcyclopentane (but no benzene as in Example II above) was added by dropwise addition to the stirred mixture. The temperature during the reaction time comprising 132 minutes ranged from 27°C to 30°C. After addition of the propionyl chloride-methylcyclopentane solution the organic phase containing the product was recovered by decantation, said organic phase weighing 42.0 grams subsequent to water-washing. The recovered product was analyzed by means of gas-liquid chromatography which revealed the chief product to be propiophenone with several other compounds possessing a longer retention time. The remainder of the sample was analyzed by preparatory gas-liquid chromatography and found to contain three isomers of (methylcyclopentyl)propiophenone, n-propylpropiophenone, and n-propyl propionate.

EXAMPLE IV

In this example a mixture of benzene, methylcyclopentane and boron fluoride is placed in a steel acylation autoclave provided with stirring means. The mixture is continuously stirred while a solution of pelargonyl bromide in methylcyclopentane is added by dropwise addition to the stirred mixture. The autoclave is maintained at a temperature of 25°C and a pressure of 5 atmospheres by the forced entry of nitrogen, a substantially inert gas, for a period of time comprising 105 minutes. After completion of the desired residence time the autoclave is allowed to return to room temperature after termination of the heat and ambient pressure after the autoclave is vented. The reaction product is recovered and subjected to analysis by gas-liquid chromatography instrumentation, said analysis disclosing the presence of pelargonylbenzene, (methylcylcopentyl)pelargonylbenzene and n-nonylpelargonylbenzene.

EXAMPLE V

In this example a mixture of benzene, methylcyclohexane and zirconium chloride is placed in a steel acylation autoclave provided with a stirring means. The mixture is continuously stirred while a solution of propionyl chloride and methylcyclohexane is added by dropwise addition to the stirred mixture. The autoclave is maintained at a temperature of 25°C and a pressure of 30 atmospheres by the forced entry of nitrogen, for a period of time comprising 210 minutes. After completion of the desired residence time the autoclave is allowed to return to room temperature after termination of the heat and ambient pressure after the autoclave is vented. The reaction product is recovered and subjected to analyses by gas-liquid chromatography instrumentation; said analysis will disclose the presence of propiophenone, (methylcyclopentyl)propiophenone and n-porpylpropiophenone.

I claim as my invention:

1. In a process for the acylation of an aromatic hydrocarbon with a carboxy acyl halide in contact with a Friedel-Crafts catalyst, the improvement which comprises reacting said aromatic hydrocarbon and carboxy acyl halide in the presence of a saturated hydrocarbon which contains at least one tertiary carbon atoms, or which is isomerized to form a saturated hydrocarbon containing a tertiary carbon atom during the reaction, and recovering the resultant acylated aromatic compounds.

2. The process of claim 1 further characterized in that the acylation is effected at a temperature in the range of about 0°C to about 100°C and a pressure in the range of from about one atmosphere to about 100 atmospheres.

3. The process of claim 1 further characterized in that said Friedel-Crafts catalyst is aluminum chloride.

4. The process of claim 1 further characterized in that said Friedel-Crafts catalyst is zirconium chloride.

5. The process of claim 1 further characterized in that said Friedel-Crafts catalyst is boron fluoride.

6. The process of claim 1 further characterized in that the aromatic hydrocarbon is benzene, the carboxy acyl halide is propionyl chloride, the saturated hydrocarbon is isopentane and the resultant acylated aromatic compounds are propiophenone, pentylpropiophenones, and n-propylpropiophenone.

7. The process of claim 1 further characterized in that the aromatic hydrocarbon is benzene, the carboxy acyl halide is propionyl chloride, the saturated hydrocarbon is methylcyclopentane, and the resultant acylated aromatic compounds are propiophenone, (methycyclopentyl)propiophenone, and n-propylpropiophenone.

8. The process of claim 1 further characterized in that the aromatic hydrocarbon is benzene, the carboxy acyl halide is pelargonyl bromide, the saturated hydrocarbon is methylcyclopentane, and the resultant acylated aromatic compounds are pelargonylbenzene, (methylcyclopentyl)pelargonylbenzene and n-nonylpelargonylbenzene.

* * * * *